Patented Feb. 22, 1949

2,462,538

UNITED STATES PATENT OFFICE 2,462,538

THERMAL INSULATING BUILDING MATERIAL AND ITS METHOD OF MANUFACTURE

Joseph S. Nagel, Santa Ana, Calif.

No Drawing. Application December 5, 1944, Serial No. 566,780

9 Claims. (Cl. 106—78)

This invention has to do with improved materials adaptable by virtue of certain outstanding qualities and properties, for various uses such as preformed building or structural units, e. g. slabs, beams, wall and roof sections, shingles, tile substitutes and the like, as well as other purposes requiring a strong, light-weight moisture and acid resistant material of low heat conductivity. Especially contemplated is an improved material for forming prefabricated building units, although broadly considered, the invention is independent of any particular use for the material.

My primary object is to provide a material in the nature of artificial stone, and a method for its manufacture, whereby it is now made possible to produce in great quantities and at exceptionally low cost, a product superior to the materials of this general type heretofore proposed. The present product may be characterized as comprising predominately a porous, lightweight aggregate, with or without additional aggregate of a diatomaceous origin, bonded together by substantially water insoluble silicate to form an integrated mass. Thus the material is given the essential bulk constituency of a refractory, light-weight material of low thermal conductivity, integrated by a binder which is indestructible under normal conditions. For most uses, it is desirable that the material be water repellent and resistant to acids and alkalies. Accordingly, provision is made for uniformly impregnating the mass with suitable water proofing material.

Although various particular features and objects of the invention with respect both to the material and its method of manufacture, might be recited at length, all these will be most readily explained by proceeding with a description of the materials employed and the method of treating them to form the finished product.

The invention broadly contemplates the use of any suitable natural or artificial light-weight aggregate having particle size gradations to suit the requirements and specifications of a product to be used for a particular purpose. Generally speaking, it is preferred that the aggregate shall consist of a hard, porous and therefore light-weight material resistant to attack and disintegration, and having by reason of its porous or open formation, thermal insulating qualities. Typically, suitable aggregates may consist of or include natural or artificial pumice, slag, cinders, mountain cork, expanded obsidian, vesicular clays and shales. Preferably, I use what may be termed an artificial aggregate consisting of an expanded or bloated clay or shale of known types and compositions, prepared by burning at the proper temperature a natural clay or shale capable of conversion by heating to cellular, vesicular or expanded form. Such aggregate may either be made to proper size or crushed to smaller sizes capable of classification or segregation to the proper size gradation. For use in the manufacture of building units such as slabs and the like, the aggregate typically may consist of 60 parts passing through a one-half inch screen, 30 parts passing through a 12 mesh screen, and 25 parts passing through a 40 mesh screen.

Ordinarily, and particularly where a relatively dense and strong product is desired, I incorporate with or supplement the expanded aggregate with a suitable quantity of finely divided diatomaceous earth. Such earths of the type and quality found in the Lompoc, California, area are suitable, as are diatomaceous earths found in many other parts of the country. Typically, the aggregate may include about 20 parts of powdered diatomaceous earth.

In the product, the aggregate particles are integrated by a strong indestructible bond, the ultimate composition of which comprises substantially water insoluble alkaline earth metal silicate. Initially, i. e. when mixed with the aggregate, the silicate bonding material comprises a soluble alkali metal silicate, typically sodium silicate or potassium silicate, and preferably 40 Bé. sodium silicate. The proper proportion of sodium silicate may be suitably adjusted, although as illustrative, I may add to the parts of aggregate and diatomaceous earth referred to in the foregoing, about 12 parts of 40 Bé. sodium silicate (all parts of the composition are by volume).

Primarily for the purpose of converting the sodium silicate to a substantially water insoluble binder in the final product, I incorporate in the mixture one or more compounds having an available alkali earth metal for replacement of sodium in the sodium silicate so that the latter is converted to an insoluble form. Preferably, I add one or more calcium compounds, for example 5 parts of calcium hydroxide or one-half part of calcium chloride. Ordinarily I prefer also to include about 20 parts of finely divided calcium carbonate in the mixture, primarily for the purpose of increasing its strength, while at the same time providing available calcium capable over a relatively extended time of replacing sodium in the silicate, although not at the relatively rapid rate at which such sodium is replaceable by the calcium in the hydroxide or chloride.

A further additive, consisting preferably of around three-fourths part of sodium hydroxide (96% pure) is added to the mixture to serve as an agent which apparently has a beneficial action and effect upon the diatomaceous earth component. In this connection, it is observed that in the presence of the sodium hydroxide, a mixture of the sodium silicate and diatomaceous earth is converted to a mass of putty-like consistency. Soda ash has been used in place of the sodium hydroxide solution, but the latter is preferred.

Where the product is to be rendered non-porous, water proof, and most effectively resistant to agents such as alkalies and acids, the mixture will include suitable water proofing material, preferably of a hydrocarbon nature. For example, I may use one-half part of melted paraffin, together with one part melted asphalt road oil normally of non-flowing viscosity, but highly fluid when heated to around 300° F. When it is desired to make a porous or adsorptive product, the water proofing material may be omitted, and for a still more porous product, the diatomaceous earth may be omitted.

The proportions referred to in the foregoing are suitably commingled to produce a mixture of uniform composition. Preferably, though typically, the materials are mixed using a rotating paddle-type mixer in which the materials are agitated in a stationary trough. In addition to assuring uniformity of particle distribution and composition of the material, the mixing operation serves to free the material of most or substantially all of its moisture content, except for chemically combined water. Accordingly, mixing continues until surplus water is evaporated and the particles roll freely in the mixer. In the absence of provision for heating the materials during their mixing, the time required for elimination of excess moisture depends generally upon the atmospheric humidity. Typically, the time may run from about 20 to 30 minutes. The rate of dehydration may be accelerated by heating the materials during mixing, in which event excess moisture can be eliminated in a matter of two or three minutes, although care must be taken not to excessively dehydrate the mixture. Heating the aggregate before mixing aids in the distribution of the paraffin and asphalt and also accelerates evaporation of excess moisture. Ordinarily, the mixing operation will continue until the resulting agglomerated or pelletized bodies begin to roll freely without adherence to one another. The mixture is then passed through a suitable machine or operation which so rubs or otherwise disintegrates the pellets that they are broken down into their relatively small or separate particles.

The mixture then is placed into forms, the size and shape of which depend upon the type of bodies or units to be cast, and compressed under suitable pressure. Ordinarily the required pressure need not exceed about 500 pounds per square inch for each two inch thickness of the material being compressed. After compression in the forms, the material may be baked at once or may be kept for extended periods of time before baking. The purpose of the baking is to cause immediate integration of the mixture components to form a hard mass characterized by its great strength notwithstanding its bulk consistency of porous, lightweight aggregate. Complete baking will occur at a temperature that need not exceed 600° F. and ordinarily is maintained at around 500° F., over a period of about one hour for each inch in thickness of the material. The bodies are then slowly cooled without excessive draft, and are then ready for use.

The resulting product is a compact and yet light-weight porous artificial stone of high insulating value and of high compressive, tensile and shearing strength. Sample blocks made of very coarse aggregate have tested in excess of 3700 pounds per square inch compression strength, and over 500 pounds per square inch tensile strength. Corresponding strengths are even greater where more finely divided, properly graded aggregate is used. Thermal insulating tests show a K factor of 0.663. The product has substantial elasticity and will not break under great stress. The material is fire proof and can be heated to a red heat without crumbling or giving indications of deterioration.

It is contemplated that the material may be used in the formation of building units or slabs having metal frames and re-enforcing rods, see for example the structures disclosed in my United States Patent No. 2,081,499 entitled "Building structures," and my copending application Ser. No. 564,208, on Building construction. To insure very strong bonds between the body material of the slab and metal parts, the metal may be coated before casting the slab material against it, with a composition including about 20 parts of 40 Bé. sodium silicate, 20 parts powdered silica, 20 parts calcium carbonate, and 1 part sodium hydroxide, the parts being by volume. The coating strongly adheres to and binds the contacting surfaces of the metal and slab body composition. It may be mentioned that the coating may also be applied to exposed metal surfaces as a base for finishing materials such as paint or stucco. When baked, the coating is highly resistant to moisture penetration and therefore serves effectively to prevent the formation of rust or other forms of corrosion.

I claim:

1. The method that includes, forming a uniform mixture of solid light weight porous aggregate particles, a relatively small proportion of a solution of a water soluble alkali metal silicate, and an alkali earth metal compound reactive with said silicate to convert same to an insoluble silicate, dehydrating said mixture to a degree such that the mixture will assume pelletized form upon agitation, agitating the mixture, compressing the dehydrated mixture, and heating the compressed mixture to convert it to a hard integrated mass of high compression strength.

2. The method that includes, forming a uniform mixture of solid light weight porous aggregate particles, a relatively small proportion of a solution of a water soluble alkali metal silicate, an alkali earth metal compound of the group consisting of calcium chloride and calcium hydroxide, reactive with said silicate to convert same to an insoluble silicate, dehydrating said mixture to a degree such that the mixture will assume pelletized form upon agitation, agitating the mixture, compressing the dehydrated mixture, and heating the compressed mixture to convert it to a hard integrated mass of high compression.

3. The method that includes, forming a uniform mixture of solid light weight porous aggregate particles, a relatively small proportion of a solution of a water soluble alkali metal silicate, and alkali earth metal compound reactive with said silicate to convert same to an insoluble silicate, and hydrocarbon waterproofing material uniformly distributed throughout the mixture, dehydrating said mixture to a degree such that the mixture will assume pelletized form upon agitation, agitating the mixture, compressing the dehydrated mixture, and heating the compressed mixture to convert it to a hard integrated mass of high compression strength.

4. The method that includes, forming a uniform mixture of solid light weight porous aggregate particles, a relatively small proportion of a sodium silicate, sodium hydroxide, and an alkali earth metal compound reactive with said silicate to convert same to an insoluble silicate, dehydrating said mixture to a degree such that the mixture will assume pelletized form upon agitation, agitating the mixture, compressing the dehydrated mixture, and heating the compressed mixture to convert it to a hard integrated mass of high compression strength.

5. The method that includes, forming a uniform mixture of solid light weight porous aggregate particles, a relatively small proportion of a solution of a water soluble alkali metal silicate, and an alkali earth metal compound reactive with said silicate to convert same to an insoluble silicate, dehydrating said mixture to a degree such that the mixture will assume pelletized form upon agitation, agitating the mixture, compressing the dehydrated mixture, and heating the compressed mixture to a temperature in the range of about 500 to 600° F. to convert it to a hard integrated mass of high compression strength.

6. The method that includes, forming a uniform mixture of hard porous aggregate particles, a relatively small proportion of sodium silicate, sodium hydroxide, a compound of the group consisting of calcium hydroxide and calcium chloride reactive with said silicate to convert it to calcium silicate, diatomaceous earth, calcium carbonate, and thermoplastic hydrocarbon waterproofing material uniformly distributed throughout the mixture, dehydrating said mixture to a degree such that the mixture will assume pelletized form upon agitation, agitating the mixture, compressing the dehydrated mixture, and heating the compressed mixture to convert it to a hard integrated mass of high compression strength.

7. The product resulting from dehydration, molding and heating without substantial intumescence, a uniform mixture of about 115 parts porous aggregate granules, water insoluble alkali earth metal silicate formed by reaction of an alkali earth metal compound with about 12 parts of 40 Bé. sodium silicate, and about 1½ parts of thermoplastic hydrocarbon waterproofing material uniformly distributed throughout the mixture, said parts being by volume.

8. The product resulting from dehydration, molding and heating without substantial intumescence, a uniform mixture of about 115 parts porous aggregate granules, water insoluble alkali earth metal silicate formed by reaction of an alkali earth metal compound with about 12 parts of 40 Bé. sodium silicate, a small amount of sodium hydroxide, and about 1½ parts of thermoplastic hydrocarbon waterproofing material uniformly distributed throughout the mixture, said parts being by volume.

9. The product resulting from dehydration, molding and heating without substantial intumescence, a uniform mixture of about 115 parts porous aggregate granules, water insoluble alkali earth metal silicate formed by reaction of an alkali earth metal compound with about 12 parts of 40 Bé. sodium silicate, a small amount of sodium hydroxide, about 20 parts of diatomaceous earth, about 20 parts finely divided calcium carbonate, and about 1½ parts of thermoplastic hydrocarbon waterproofing material uniformly distributed throughout the mixture, said parts being by volume.

JOSEPH S. NAGEL.

REFERENCES CITED

The following references are of record in the file of this patent:

UNITED STATES PATENTS

| Number | Name | Date |
|---|---|---|
| 321,233 | Maardt | June 30, 1885 |
| 387,041 | Blake | July 31, 1888 |
| 419,657 | Gesner | Jan. 21, 1890 |
| 1,092,402 | Scharwath | Apr. 7, 1914 |
| 1,628,206 | Weiss et al. | May 10, 1927 |
| 1,724,185 | Elias | Aug. 13, 1929 |
| 1,966,069 | Kliefoth | July 10, 1934 |

FOREIGN PATENTS

| Number | Country | Date |
|---|---|---|
| 118,871 | Great Britain | Sept. 19, 1918 |
| 456,562 | Great Britain | Nov. 11, 1936 |